United States Patent [19]

Kurematsu et al.

[11] Patent Number: 4,985,118
[45] Date of Patent: Jan. 15, 1991

[54] METHOD FOR TREATING PHOTOGRAPHIC PROCESS WASTE LIQUOR THROUGH CONCENTRATION BY EVAPORATION

[75] Inventors: Masayuki Kurematsu; Shigeharu Koboshi; Kazuhiro Kobayashi; Naoki Takabayashi, all of Hino, Japan

[73] Assignee: Konica Corporation, Tokyo, Japan

[21] Appl. No.: 513,442

[22] Filed: Apr. 23, 1990

Related U.S. Application Data

[63] Continuation of Ser. No. 169,324, Mar. 17, 1988, abandoned.

[30] Foreign Application Priority Data

Mar. 24, 1987 [JP]  Japan .................. 62-69435
Mar. 24, 1987 [JP]  Japan .................. 62-69437

[51] Int. Cl.$^5$ .................. B01D 1/00; B01D 3/42
[52] U.S. Cl. .................. 159/47.3; 159/16.1; 202/181; 203/1; 203/49; 203/100; 203/DIG. 7; 203/DIG. 18; 354/300
[58] Field of Search .......... 159/47.3, 16.1; 203/1, 203/DIG. 7, 49, DIG. 18, 100; 202/181; 73/64.4; 354/350

[56] References Cited

U.S. PATENT DOCUMENTS

| | | | |
|---|---|---|---|
| 2,027,115 | 1/1936 | Oman et al. | 203/20 |
| 3,869,383 | 3/1975 | Shimamura et al. | 210/32 |
| 3,904,392 | 9/1975 | Van Ingen et al. | 159/900 |
| 3,910,812 | 10/1975 | Kaneko et al. | 159/3 |
| 3,995,298 | 11/1976 | Van deputte et al. | 354/324 |
| 4,017,421 | 4/1977 | Othmer | 159/47.3 |
| 4,043,907 | 8/1977 | Shimamura et al. | 210/32 |
| 4,062,031 | 12/1977 | Schröter | 354/299 |
| 4,073,705 | 2/1978 | Torikai et al. | 204/92 |
| 4,319,826 | 3/1982 | von dem Bussche et al. | 354/299 |
| 4,323,424 | 4/1982 | Secunda et al. | 159/48.1 |
| 4,612,090 | 9/1986 | Ellis, Jr. | 202/196 |
| 4,640,769 | 2/1987 | Wemhoff | 159/47.3 |
| 4,724,044 | 2/1988 | Weishaar et al. | 159/47.3 |
| 4,735,728 | 4/1988 | Wermhoff | 159/47.3 |
| 4,755,843 | 7/1988 | Foley | 354/324 |

FOREIGN PATENT DOCUMENTS

| | | |
|---|---|---|
| 0223605 | 5/1987 | European Pat. Off. . |
| 2427651 | 12/1975 | Fed. Rep. of Germany . |
| 2427651 | 12/1975 | Fed. Rep. of Germany . |
| 48-84462 | 1/1973 | Japan . |
| 49-58833 | 6/1974 | Japan . |
| 49-64257 | 6/1974 | Japan . |
| 49-119457 | 11/1974 | Japan . |
| 49-119458 | 11/1974 | Japan . |
| 50-22463 | 3/1975 | Japan . |
| 51-37704 | 10/1975 | Japan . |
| 51-7952 | 3/1976 | Japan . |
| 53-383 | 1/1978 | Japan . |
| 53-12152 | 2/1978 | Japan . |
| 53-63763 | 6/1978 | Japan . |
| 53-43271 | 11/1978 | Japan . |
| 53-43478 | 11/1978 | Japan . |
| 56-33996 | 8/1981 | Japan . |
| 57-37395 | 8/1982 | Japan . |
| 57-37396 | 8/1982 | Japan . |
| 60-70841 | 5/1985 | Japan . |
| 0232551 | 11/1985 | Japan .................. 354/324 |
| 2118346 | 5/1987 | Japan .................. 203/1 |

OTHER PUBLICATIONS

Morton, "Laboratory Technique in Organic Chemistry", 1st Ed., 1938, pp. 104 & 105.
Patent Abstracts of Japan, vol. 12m Bi, 32 (P-661) [2879], 30th Jan. 1988, p. 109, P 661; & JP-A-62 184 459 (Konishiroku Photo Ind. Co., Ltd.), 12-08-87.
Patent Abstracts of Japan, vol. 12m Bi, 32 (P-661) [2879], 30th Jan. 1988, p. 109, p. 661; & JP-A-62 184 459 (Konishiroku Photo Ind. Co., Ltd.), 12-08-87.

*Primary Examiner*—Virginia Manoharan
*Attorney, Agent, or Firm*—Frishauf, Holtz, Goodman & Woodward

[57] ABSTRACT

A method for treating photographic process waste liquor by evaporation to concentrat the waste liquor. The method includes evaporating with a heating device which has a heat density of about 17.2 kcal/cm$^2$ or less; and intermittently feeding the waste liquor to maintain a predetermined liquid level in the vessel. By controlling the heating and/or the liquid level in the evaporation vessel, odors are controlled while efficiency is maintained.

5 Claims, 6 Drawing Sheets

METHOD FOR TREATING PHOTOGRAPHIC PROCESS WASTE LIQUOR THROUGH CONCENTRATION BY EVAPORATION

This application is a continuation of application Ser. No. 169,324, filed Mar. 17, 1988, abandoned.

BACKGROUND OF THE INVENTION

This invention relates to an apparatus for treating waste liquor produced concomitantly with development processing of light-sensitive photographic materials using an automatic processing machine for photography (hereinafter abridged as "photographic process waste liquor" or "waste liquor") through concentration by evaporation, and, more particularly, to an apparatus for treating photographic process waste liquor through concentration by evaporation, that is suited for treating the waste liquor by installing the apparatus inside the automatic processing machine or in the vicinity thereof.

In general, the photographic processing of light-sensitive silver halide photographic materials is carried out by combining steps employing processing solutions having one or more of the functions such as developing fixing, washing, etc. in the case of black and white light-sensitive photographic materials, or color developing, bleach-fixing (or bleaching and fixing), washing, stabilizing, etc. in the case of light-sensitive color photographic materials.

Then, in the photographic processing to process a large quantity of light-sensitive materials, there is employed a means in which the performance of processing solutions is constantly maintained by removing, while replenishing components consumed by the processing, components that may be thickened or concentrated during the processing by dissolving-out in the processing solution or by evaporation (for example, bromide ions in the developing solution, silver complex salts in the fixing solution, etc.). A replenishing solution is supplied to the fixing solution for the purpose of the above replenishing, and a part of the processing solution is thrown away for the purpose of removing the above thickened or concentrated components in the photographic processing.

Recent years, because of environmental pollution or for economical reasons, replenishing solutions for photographic development processing solutions as well as washing water which is a replenishing solution for washing are undergoing a change such that they are used in a system in which the quantity of the replenishment has been greatly decreased. The photographic process waste liquor, however, is led from a processing tank of the automatic processing machine through a waste liquor pipe and thrown away in sewerages or the like after diluted with waste liquor of washing water or cooling water for the automatic processing machine.

However, because of tightened regulation in recent years against the environmental pollution, although it is possible to throw away washing water or cooling water in sewerages or rivers, it has been made substantially impossible to throw away the photographic processing solutions other than these [for example, developing solutions, fixing solutions, color-developing solutions, bleach-fixing solutions (or bleaching solutions or fixing solutions), stabilizing solutions, etc.]. For this reason, every photographic processing dealer has the waste liquor collected by dealers speciallized in the waste liquor treatment or installs an equipment for pollution-preventive treatment. However, the way of placing the waste liquor treatment to dealers' care may necessarily require a considerable space for keeping the waste liquor stored and may also be very expensive from the viewpoint of cost. Also, the equipment for pollution-preventive treatment may involve disadvantages such that it requires very large initial investment (or initial cost) and a considerably vast place for the equipment.

Moreover, although known methods for pollution-preventive treatment to decrease the burden to environmental pollution by photographic process waste liquor include an activated sludge method (Japanese Patent Publication Nos. 12943/1976, 7952/1976, etc.), an evaporation method (Japanese Unexamined Patent Publication No. 89437/1974, Japanese Patent Publication No. 33996/1981, etc.), an electrolytic oxidation method (Japanese Unexamined Patent Publication Nos. 84462/1973 and 119458/1974, Japanese Patent Publication No. 43478/1978, Japanese Unexamined Patent Publication No. 119457/1974, etc.), an ion-exchange method (Japanese Patent Publication No. 37704/1976, Japanese Unexamined Patent Publication No. 383/1978, Japanese Patent Publication No. 43271/1978, etc.), a reverse osmosis method (Japanese Unexamined Patent Publication No. 22463/1975, etc.), a chemical treatment method (Japanese Unexamined Patent Publication No. 64257/1974, Japanese Patent Publication Nos. 37396/1982, Japanese Unexamined Patent Publication Nos. 12152/1978, 58833/1974 and 63763/1978, Japanese Patent Publication No. 37395/1982, etc.), etc. these can not be said to be sufficient.

On the other hand, taking account of restriction from the viewpoint of water resource, increase in cost for water supply and drainage, simplicity in equipment for automatic processing machines, work environment surrounding the automatic processing machines, there is a recent increasing spread of photographic processing that employs an automatic processing machine requiring no piping outside the automatic processing machine, for feeding and discharging the water for washing (i.e., the so-called non-washing automatic processing machine). In such processing, it is desired to dispense with also the cooling water for controlling the temperature of processing solutions. Such photographic processing that uses substantially no washing water or cooling water has a feature that, because of no dilution with water, its burden to environmental pollution is very large and on the other hand the quantity of waste liquor is small as compared with the instance in which photographic process waste liquor is brought from the automatic processing machine.

Accordingly, because of the smallness in the quantity of waste liquor, the exterior piping for feeding and discharging solutions can be omitted, so that there can be eliminated the disadvantages such that, because of the equipment of the piping that can be regarded as a defect of the conventional automatic processing machines, the machine can be moved only with difficulty after it has been installed, provides a narrow space for footing, requires a great expense for pipework at the time of the installment, and requires an energy cost for hot-water feeding pressure. Thus, very great advantages can be exhibited such that the machine can be made so compact and so simple that it may be used as an office machine.

On the contrary, however, such waste liquor has a very high burden to environmental pollution, and thus it has become quite impossible to throw away it even into sewerage, not speak of rivers, in the light of the regulation of environmental pollution. Moreover, although the waste liquor quantity can be said to be small in such photographic processing (i.e., the processing in which no washing is carried out by use of a large quantity of running water), the waste liquor may amount to about 10 lit. per day, for example, even in color photofinishing laboratories of relatively small scale.

Accordingly, in general, the waste liquor is collected by waste liquor collecting dealers, and made harmless after secondary and tertiary treatments. However, because of an increase in the cost for the collection, not only the fees for taking over the waste liquor is increasing year by year, but also the dealers are not willing to come to collect the waste liquor to miniature photofinishing laboratories because of its low collection efficiency, thus causing problems such that shops are full of waste liquor.

On the other hand, for the purpose of solving these problems and with an aim at making it possible to readily carry out the treatment of the photographic process waste liquor also in the miniature photofinishing laboratories, it is studied to heat the photographic process waste liquor to carry out evaporation of water to dryness or effect solidification as disclosed, for example, in Japanese Utility Model Unexamined Publication No. 70841/1985. As known in the studies by the inventors, harmful or very ill-smelling gases such as sulfite gas, hydrogen sulfide and ammonia gas may generate when the photographic process waste liquor is subjected to the evaporation treatment. These were found to be generated because ammonium thiosulfate and sulfites (ammonium salt, sodium salt or potassium salt) frequently used as the fixing solution or bleach-fixing solution of the photographic processing solutions are decomposed owing to high temperature. Moreover, at the time of the evaporation treatment, the water or the like contained in the photographic process waste liquor is vaporized in the form of vapor to increase the volume and increase the pressure in a evaporating vessel. Therefore, because of this pressure, the above harmful or ill-smelling gases may necessarily leak outside the evaporation treatment apparatus to cause great difficulties from the viewpoint of the work environment.

Now, to solve these problems, Japanese Utility Model Unexamined Publication No. 70841/1985 disclosed a method in which an exhaust gas treating section comprising activated carbon or the like is provided at an exhaust pipe section of the evaporation treatment apparatus. This method, however, has a serious disadvantage that the vapor from a large quantity of water contained in the photographic process waste liquor causes sweating or moisture condensation at the exhaust gas treating section, so that a gas absorption treatment agent is covered with the water to instantaneously lose its gas absorption ability. Thus, this method has not been put into practical use.

To solve these problems, the present applicants have previously proposed, in carrying out the evaporation treatment of photographic process waste liquor, a method of, and an apparatus for, treating photographic process waste liquor, provided with a cooling and condensing means capable of condensing the vapor generated by the evaporation and further treating the condensate water generated by condensation, simultaneously also treating uncondensed components, to discharge them to the outside.

However, there were found the following problems in the above proposal. Specifically, the vapor generated by evaporation treatment, which is condensed by a cooling and condensing means, may be discharged outside the apparatus in a higher proportion without being condensed if the cooling and condensing efficiency is low. Even if it is treated by activated carbon, ill-smelling harmful gas may be discharged outside the apparatus also in a higher proportion. Further, there are instances where the condensate water produced by condensation by the cooling and condensing means smells when thrown away, or has so a high burden to environmental pollution that it can not be discharged into sewerages or the like as it is. Still further, when the waste liquor is treated by evaporation, the waste liquor in an evaporation vessel may spout by bumping from a lead-in pipe for leading the vapor to the cooling and condensing means, and flow into a stock tank (or reservoir) of condensate water. If it is attempted to prevent an accident due to such pumping, it becomes necessary to make very large the volume at the air space of the evaporation vessel. Still further, because of the space very limited in the miniature photofinishing laboratories, not only the ill smell generated by the treatment of the photographic processing solutions is questioned, but also the space for installing the photographic process waste liquor treatment apparatus itself is questioned. The cost for the apparatus and the running cost also involve important problems. Accordingly, a compact, inexpensive and running-cost-low treatment apparatus that can treat the photographic process waste liquor without generating ill-smelling harmful gas has been sought after.

SUMMARY OF THE INVENTION

This invention has been made taking account of the above problems conventionally involved in the art, and a first object of this invention is to provide an apparatus for treating photographic process waste liquor through concentration by evaporation, that may involve less harmful or ill-smelling components to be generated by the photographic process waste liquor. A second object of this invention is to provide an apparatus for treating photographic process waste liquor through concentration by evaporation, that may cause less bumping at the time of the evaporation treatment. A third object of this invention is to provide an apparatus for treating photographic process waste liquor through concentration by evaporation, that can achieve good thermal efficiency, can achieve good evaporation efficiency, can reduce energy cost and can make an apparatus compact. A fourth object of this invention is to provide an apparatus for treating photographic process waste liquor through concentration by evaporation, that can surely feed the waste liquor to be treated.

The present inventors discovered that the first to third objects among the above objects can be achieved by an apparatus for treating photographic process waste liquor, comprising an evaporation vessel and a heating means, wherein said heating means has a heat density of about 17.2 kcal/cm$^2$ or less.

The present inventors discovered also that the first and fourth objects can be achieved by an apparatus for treating photographic process waste liquor, comprising an evaporation vessel and a heating means, wherein the apparatus is provided with a means for intermittently feeding the waste liquor according to a signal from a means for detecting the quantity of the waste liquor in said evaporation vessel.

DESCRIPTION OF THE PREFERRED EMBODIMENTS

Figure 1:
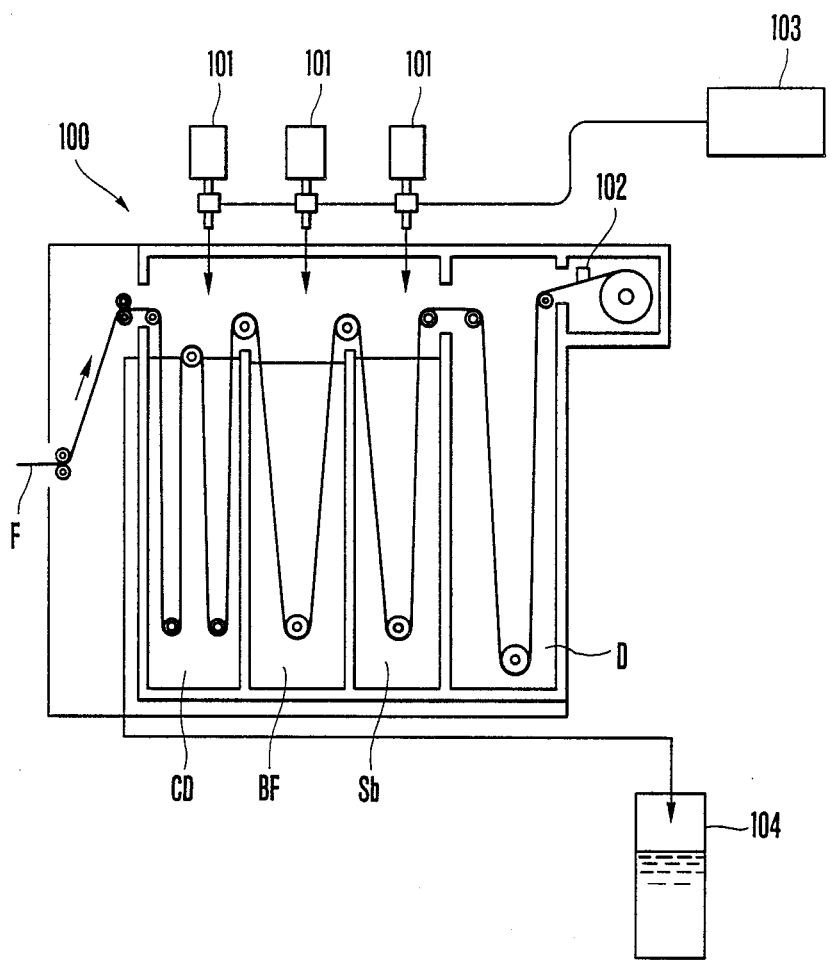
FIG. 1 is a schematic illustration of an automatic processing machine.

In this invention, the heat density of the heating means refers to a value obtained by dividing the total heat capacity of the heating means by the area at which the heating means comes into contact with the waste liquor, and, in this invention, the heat density is controlled to about 17.2 kcal/cm$^2$ or less, whereby it is possible to suppress the generation of ill-smelling harmful gas and prevent the bumping. In other words, if the heat density is more than about 17.2 kcal/cm$^2$, the rate of the evaporation of the waste liquor by the heat of the heating means may become too high to follow up the feeding of the waste liquor to the surface of the heating means, resulting in the formation of a vapor layer on the surface of the heating means. Thus, presumably the vapor is superheated in the vicinity of the surface of the heating means to cause the generation of ill smell and also cause the bumping.

In this invention, the heat density of the heating means is controlled to about 17.2 kcal/cm$^2$ or less and a gas is further fed into the waste liquor present in the evaporation vessel through a means for feeding the gas, whereby the superheating of vapor as mentioned above can be more efficiently prevented. In this invention, the lower limit of the heat density is preferably 0.01 kcal/cm$^2$.

In another embodiment of this invention, the heat density of the heating means is controlled to about 17.2 kcal/cm$^2$ or less and there is further provided with a means for feeding into the evaporation vessel a compound capable of controlling the surface tension of the photographic process waste liquor to about 20 to 65 dyne/cm (hereinafter called "anti-foaming agent"). Thus, the anti-foaming agent is fed into the evaporation vessel through this means, whereby it is possible to prevent the accident that the waste liquor blows off from the lead-in pipe for leading the vapor to the cooling and condensing means.

In a most preferred embodiment of this invention, the heat density of the heating means is controlled to about 17.2 kcal/cm$^2$, a gas is fed into the waste liquor present in the evaporation vessel through a means for feeding the gas, and also an anti-foaming agent is fed into the evaporation vessel through a means for feeding the anti-foaming agent, whereby it is possible to effectively prevent the generation of ill-smelling gas or harmful gas and the accident that the waste liquor in the evaporation vessel blows off or spouts because of the bumping. The term "gas" may include air.

In this invention, the heating means may comprise a nickrome wire, or may include worked-up heaters such as a cartridge heater, a quartz heater, a Teflon heater, a rod heater and a panel heater. In another embodiment of the heating means, it may also include those in which one or a plurality of the heaters mentioned above is set in a high-boiling solvent such as silicone oil, or magnesium carbonate, magnesium oxide, diatomaceous earth or the like, or those in which these are further embedded in a block of SUS 304 or SUS 316 stainless steel or carbon steel.

The heating means may be provided in the waste liquor in the evaporation vessel, but, in order to more enhance the effect of this invention and at the same time prevent a decrease in thermal efficiency or corrosion that may occur when the photographic process waste liquor is burnt and sticked to the surface of the heating means, it is preferable to provide it outside the evaporation vessel and heat the waste liquor in the evaporation vessel through the wall of the evaporation vessel. In this instance, the heat density of the heating means refers to a value obtained by dividing the total heat capacity of the heating means by the area at which the heating means comes into contact with the waste liquor with the interposition of the wall of the evaporation vessel, and it is satisfactory if this value is about 17.2 kcal/cm$^2$ or less.

When the apparatus has the construction that the heating means is provided in the waste liquor in the evaporation vessel, the heating means may preferably be such that, for example, an anti-fixing treatment such as Teflon treatment (for example, fluorine resin coating) is applied on the surface of the heating means, for the purpose of preventing the thermal efficiency from being seriously lowered because of the fixing of the photographic process waste liquor on its surface in a burnt and sticked state or the corrosion from arising during the process in which the photographic process waste liquor is concentrated or evaporated to dryness.

Means for the Teflon treatment other than the fluorine resin coating may include, for example, those of binder type, plating type, oil-mixing type, heat treatment type and room temperature wet packing type.

The heating means may be provided at any position, i.e., an upper part, middle part or lower part of the vessel, so long as the waste liquor in the evaporation vessel can be heated, but, as described in Japanese Unexamined Patent Publication No. 201442/1987 and Japanese Patent Application No. 288328/1986, the heating means may preferably be so provided that the upper part of the photographic process waste liquor in the evaporation vessel may be heated so as to cause a difference between the temperature of the photographic process waste liquor in the vicinity of the heating means and the temperature at the bottom part of the photographic process waste liquor. In order to more enhance the effect of this invention, the heating means may preferably be so provided that this temperature difference may be controlled to 5° C. or more.

The evaporation vessel used in this invention may be of any shape, and may be in the shape of a cube, a column, a polygonal pillar including a square pillar, a cone, a polygonal pyramid including a quadrangular pyramid, or a combination of some of these, but may preferably be long in the longitudinal direction so that the difference between the temperature in the vicinity of the heating means and the temperature of the photographic process waste liquor at the bottom part may be made greater. More preferably, the space upper than the surface of the waste liquor in the evaporation vessel may be made as great as possible so as to lessen as far as possible the above-mentioned accidental blowing-off or spouting to be caused by the bumping.

The evaporation vessel may be made of any materials if they are heat-resistant materials such as heat-resistant glass, titanium, stainless steel, carbon steel, and inorganic fibers described in "Fukugo Zairyo Gijutsu Syusei (Compilations of Composite Material Techniques)", 1976, published by Sangyo Gijutsu Center, pp. 213–219; "Shinzairyo (New Materials) 1984", 1984, published by Toray Research Center, pp. 287–315); "Fukugo Zairyo (Composite Materials)", 1984, published by Tokyo University Publishing Society; etc. However, from the viewpoints of the safety and corrosion resistance, preferred are stainless steel (preferably SUS 304 or SUS 316) and titanium. The evaporation vessel may also preferably be having been subjected to the above-mentioned anti-fixing treatment such as Teflon treatment.

The treatment apparatus of this invention may preferably have a means for feeding a gas into the waste liquor inside the evaporation vessel, and the gas concerning this invention refers to air, nitrogen gas, carbonic acid gas, oxygen gas, fron gas, etc., and there may be used any gases so long as they are a gas. However, for the economical reason and from the viewpoint of the safety, preferably used is air.

The means for feeding the above gas may be a means in which a pressure valve or solenoid valve is provided on a cylinder in which the above gas is hermetically contained, or, when the above gas is air, there may preferably be used a compressor, an air pump and a bellows type air pump.

In instances in which the air is led into the evaporation vessel by means of an air pump, the air may be air inside the treatment apparatus or air outside the treatment apparatus. It may also be air in a waste liquor tank for holding the waste liquor. A most preferred embodiment is such that, when the treatment apparatus of this invention has the means for cooling and condensing the vapor, the air is air in a condensate water tank (a stored liquid tank) for holding the condensate water formed by condensation by means of the cooling and condensing means. In this occasion, since the ill-smelling gas or harmful gas contained in the vapor not condensed by the cooling and condensing means can be again brought to the evaporation vessel, it can be possible to prevent the ill-smelling gas or harmful gas from leaking out of the concentration-by-evaporation treatment apparatus.

The concentration-by-evaporation treatment apparatus of this invention may preferably has the means for feeding into the evaporation vessel a compound capable of controlling the surface tension of the photographic process waste liquor to 20 to 65 dyne/cm. This compound may particularly preferably be a compound capable of controlling the surface tension to 25 to 60 dyne/cm. This compound is the so-called anti-foaming agent or surface active agent including, for example, polyorganosiloxanes and higher alcohols. As the means for feeding this compound into the evaporation vessel, there can be used constant rate pumps or non-constant rate pumps such as a tube pump, a magnetic constant rate pump, a plunger constant rate pump, a bellows pump, a gear pump, a magnet pump, a constant rate magnet pump, a screw pump and a diaphragm pump, but, in particular, preferably used are constant rate pumps.

The concentration-by-evaporation treatment apparatus of this invention may preferably have a means for feeding the photographic process waste liquor into the evaporation vessel. As the means for feeding the photographic process waste liquor into the evaporation vessel, there can be used the same constant rate pumps or non-constant rate pumps as in the means for feeding the compound capable of controlling the surface tension of the photographic process waste liquor to about 20 to 65 dyne/cm, but, in particular, preferably used are constant rate pumps.

In the concentration-by-evaporation treatment apparatus of this invention, the means for feeding the compound capable of controlling the surface tension of the photographic process waste liquor to about 20 to 65 dyne/cm may preferably be the means for feeding the photographic process waste liquor into the evaporation vessel. In this instance, the compound capable of controlling the surface tension of the photographic process waste liquor to about 20 to 65 dyne/cm is beforehand incorporated in the photographic process waste liquor before the waste liquor is fed to the evaporation means.

The photographic process waste liquor overflown from the automatic processing machine may be directly fed as it is, into the evaporation vessel of the treatment apparatus of this invention. Here, the means for feeding the photographic process waste liquor into the evaporation vessel merely refers to a lead-in pipe for leading the overflow into the evaporation vessel, and a solenoid valve or the like may be provided on this lead-in pipe. The photographic process waste liquor overflown from the automatic processing machine may preferably be once stored in a tank (a waste liquor tank) and then led into the evaporation vessel. However, in instances in which this waste liquor tank is positioned at an upper part of the evaporation vessel, the pump may not necessarily be used as the means for feeding the photographic process waste liquor into the evaporation vessel. Such a means may merely be a lead-in pipe for leading the waste liquor from the waste liquor tank into the evaporation vessel, and a solenoid valve or the like may be provided on the lead-in pipe. When the photographic process waste liquor overflown from the automatic processing machine is once stored in the waste liquor tank, this waste liquor tank is a tank for storing the overflow from the automatic processing machine (a first overflow tank), and at the same time may be a tank for storing the waste liquor to be fed to the evaporation vessel (a waste liquor feeding tank). Alternatively, the overflow may be once stored in the overflow tank in a given amount and then transferred to the waste liquor feeding tank, but preferably the overflow tank and the feeding tank are the same. In this instance, after the overflow was stored in the waste liquor tank, the waste liquor may be fed into the evaporation vessel, but, alternatively, after the overflow was stored in the waste liquor tank, this waste liquor tank may be provided in the vicinity of the concentration-by-evaporation treatment apparatus of this invention or inside the concentration-by-evaporation treatment apparatus to use it as the waste liquor feeding tank. The waste liquor feeding tank may preferably be provided inside the concentration-by-evaporation treatment apparatus of this invention as the space can be thereby saved. In instances in which the waste liquor feeding tank is provided inside the concentration-by-evaporation treatment apparatus of this invention, the waste liquor feeding tank may preferably be placed on a pedestal capable of being pulled out, as the workability can be thereby improved.

The waste liquor feeding tank may preferably be provided with a liquid level sensor or a means for detecting the weight, and constituted so that the actuation of the waste liquor feeding means or the actuation of the heating means may be stopped when the waste liquor in the waste liquor feeding tank runs short.

The means for intermittently feeding the waste liquor according to a signal from a means for detecting the quantity of the waste liquor in said evaporation vessel will be described below, which is one of the embodiments of this invention. This means of course may also be used in combination with the method by which the heat density is controlled to about 17.2 kcal/cm$^2$ or less.

In the concentration-by-evaporation treatment apparatus of this invention, the photographic process waste liquor may preferably be fed from the waste liquor feeding tank into the evaporation vessel through the means for feeding the photographic process waste liquor into the evaporation vessel as described above. For the feeding of the photographic process waste liquor according to this means, available are a system in which the waste liquor is fed into the evaporation vessel at one time in an amount as much as it can be stored in the evaporation vessel and no waste liquor is fed in the course of the concentration by evaporation and a system in which it has a means for detecting the quantity of the waste liquor present in the evaporation vessel and the waste liquor is intermittently fed into the evaporation vessel according to a signal from this detecting means. Preferred, however, is the latter system as there may be generated less ill-smelling gas or harmful gas. The means for detecting the quantity of the waste liquor present in the evaporation vessel may preferably be a liquid level sensor, or the feeding of the waste liquor to the evaporation vessel may be controlled with use of a timer by measuring the evaporation rate in advance. Since, however, the evaporation rate may change as the concentration proceeds or may vary depending on the liquid composition, preferred is to detect the waste liquor quantity with use of the liquid level sensor.

The liquid level sensor and the means for feeding the waste liquor into the evaporation vessel may preferably be so constituted that they are actuated in such a manner that they may stop when the liquid level sensor detects the liquid level for a certain time and may start when it does not detect the liquid level for a certain time. In other words, since in the evaporation vessel the liquid level may always change owing to the boiling, the on and off of the waste liquor feeding means are frequently repeated to cause troubles, unless such constitution is taken. What is meant by "a certain time" is not less than 1 second and not more than 10 minutes, preferably not less than 1 second and not more than 1 minute, which may vary depending of the capacity of the evaporation vessel. In a preferred embodiment, the liquid level sensor is provided in a connecting pipe provided outside the evaporation vessel. This is preferred because the change of the liquid level owing to the boiling can be small. In this instance, there may be added the function that the feeding of the waste liquor is stopped when the liquid level sensor detects the liquid level for a certain time and is started when it does not detect the liquid level for a certain time as described above, whereby troubles can be lessened preferably.

The concentration-by-evaporation treatment apparatus of this invention may preferably have the means for cooling and condensing the vapor formed by evaporation. In the cooling and condensing means, all sorts of heat exchanging means can be employed, and they may be of any constitution including;

(1) a shell and tube type (or multi-tube type, thimble type);
(2) a double tube type;
(3) a coil type;
(4) a helical type;
(5) a plate type;
(6) a fin tube type;
(7) a trombone type; and
(8) an air cooling type;

Techniques for heat exchange type reboilers may also be used, and there may be employed those of;

(1) a vertical thermosiphon type;
(2) a horizontal thermosiphon type;
(3) an overflow type (kettle type);
(4) a forced circulation type;
(5) an interpolation type; etc.

Techniques for condenser type heat exchange may further be employed, and there may be used any of those of;

(1) a direct condenser type;
(2) a built-in-column type;
(3) a built-on-top column type;
(4) a separate type; etc.

It is also possible to use coolers, and the types of the coolers can be arbitrarily selected.

Air cooling type heat exchangers may be also used advantageously, and there may be used any of those of;

(1) a forced draft type; and
(2) a blowing draft type.

A preferred embodiment is such that this cooling and condensing means is constituted as a heat dissipation device provided with a heat dissipation plate (or an air-cooling fun) on a vapor discharge pipe for discharging the vapor formed by evaporation, and has a means for feeding water on this heat dissipation plate. In this instance, the water may preferably be fed on the heat dissipation plate from an upper part of a device comprising the heat dissipation plate in a shower form. The water may be fed, for example, from a cock of city water on the heat dissipation plate through a valve or solenoid valve if necessary. In this instance, the means for feeding water refers to a cock of city water, a water feeding pipe, a valve, a solenoid valve, etc. However, preferred is to use stored water, which may preferably be fed on the heat dissipation plate through a water-feeding means including constant rate pumps (for example, a tube pump, a magnetic constant rate pump, a plunger constant rate pump, a bellows pump, a gear pump, a magnet pump, a constant rate magnet pump, a screw pump, a diaphragm pump, etc.) or non-constant rate pumps as described above. Particularly preferred is to constitute the means so that the stored water may be circulated in such a manner that the water in a stored water tank provided at a lower part of the heat dissipation plate device may be fed in a shower form on the heat dissipation plate through a pump and again stored in the stored water tank at the lower part. In this instance, desired is that a liquid level sensor is provided in the stored water tank so that the short of the stored water can be detected by sending a signal when the liquid level became lower than a given level, and the water is again fed.

The cooling and condensing means may preferably be constituted as the heat dissipation plate device provided with the heat dissipation plate (or air cooling fun) on the vapor discharge pipe for discharging the vapor formed by evaporation, and, when there is provided the means for feeding water on this heat dissipation plate, it is preferably simultaneously provided with a fan for air cooling. However, in this instance, particularly preferred is that the fan for air cooling is provided in the manner that the air can be discharged outside the concentration-by-evaporation treatment apparatus of this invention through the heat dissipation plate device, as it is thereby possible to prevent the condensation from occurring in electric equipment sections in the concentration-by-evaporation treatment apparatus of this invention.

The condensate water obtained by cooling and condensing the vapor formed by evaporation is stored in a tank for storing the condensate water (i.e., a stored liquid tank). This stored liquid tank may preferably be provided in the inside of the concentration-by-evaporation treatment apparatus of this invention as the space can be thereby saved, and, in this instance, the stored liquid tank may preferably be placed on a pedestal capable of being pulled out, for the purpose of improving the workability.

The concentration-by-evaporation treatment apparatus of this invention may preferably have a means for feeding an alkali agent in the evaporation vessel. In this instance, the generation of ill-smelling gas or harmful gas can be prevented by preventing the sulfation of the waste liquor that may occur because of a lowering of the pH of the waste liquor in the evaporation vessel.

The alkali agent may include hydroxides of alkali metals or alkaline earth metals such as sodium hydroxide, potassium hydroxide and calcium hydroxide, carbonates, silicates, phosphates, foliates, etc. The alkali agent may be fed to the evaporation vessel from a stock tank for an aqueous alkali agent solution obtained by dissolving the alkali agent in water, through the constant rate pump or non-constant rate pump of the types as described above.

However, preferred is that the alkali agent is added in advance in the waste liquor in a waste liquor feeding tank and then fed into the evaporation vessel through the means for feeding the waste liquor. Here, the means for feeding the alkali agent serves also as the waste liquor feeding means.

The concentration-by-evaporation treatment apparatus of this invention may preferably has the means for cooling and condensing the vapor formed by evaporation, as the ill-smelling gas or harmful gas can be thereby prevented from being generated. However, regarding the condensate water thus obtained, care should be taken that (1) at least one secondary treatment selected from the following (A) to (J) is applied to the condensate water, namely, (A) activated carbon treatment, (B) ultraviolet exposure treatment, (C) reverse osmosis treatment, (D) oxidizing agent treatment, (E) electrolytic oxidation treatment, (F) aeration treatment, (G) electrodialysis treatment, (H) redistillation treatment, (I) ion exchange resin treatment and (J) pH adjustment, and (2) the condensate water is used as dissolving water of photographic processing solutions.

The activated carbon used in the above activated carbon treatment of this invention may include any of activated carbon that is adsorptive to at least one substance of benzyl alcohol, ammonium compounds and sulfur compounds.

In this invention, it is possible to use any activated carbon regardless of what its materials are and how activated it is, or any of powdery or granular activated carbon, preferably granular activated carbon, and particularly preferably coconut shell activated carbon and activated carbon having a molecular sieve ability. Here, the activated carbon having a molecular sieve ability refers to the one having slit-shaped pores, which pores may desirably be 6 A or more in size and 15 A or less in width. For such activated carbon having a molecular sieve ability, reference can be made to the disclosure in Japanese Unexamined Patent Publication No. 14831/1983.

As the adsorptive material used when the condensate water of the photographic process waste liquor is subjected to adsorption treatment, there can be used, in addition to the above activated carbon, the materials as follows:

(1) clay materials;
(2) polyamide type polymeric compounds;
(3) polyurethane type polymeric compounds;
(4) phenol resin;
(5) epoxy resin;
(6) polymeric compounds having a hydrazide group;
(7) polymeric compounds having a polytetrafluoroethylene group;
(8) mono- or polyhydric alcohol methacrylic acid monoester-polyhydric alcohol methacrylic acid; and
(9) polyester copolymers.

Details of these materials of (1) to (9) are available by making reference to the disclosure in Japanese Unexamined Patent Publication No. 4051/1986 (in particular, pages 62 to 66).

For the ultraviolet exposure of the condensate water of the photographic process waste liquor of this invention, there can be used an ultraviolet exposure device, a halogen lump, etc., to which, however, there is no particular limitation. Known ultraviolet exposure devices are those having an output of from 5 W to 1 kW, but by no means limited to this. Also, in this invention, electromagnetic waves and light having a wavelength outside the range of 190 nm to 400 nm are emitted from an ultraviolet lamp, to which the condensate water obtained from the photographic process waste liquor may be exposed. Infrared rays may also be used in combination.

The ultraviolet lamp or the like used in this invention may be of double tube type.

In this invention, the ultraviolet exposure is meant to bring the condensate water obtained from the photographic process waste liquor is exposed to ultraviolet rays with use of an ultraviolet lamp or the like, and such ultraviolet exposure may be carried out to the condensate water in an continuous manner, or may be carried out in an intermittent manner if necessary.

In the above reverse osmosis treatment, it is possible to utilize all sorts of reverse osmotic membranes, or desalting and concentrating methods and devices using reverse osmotic membranes. Preferably used as the reverse osmotic membranes are cellulose acetate, aromatic polyamide, polyvinyl alcohol and polysulfone, and particularly preferably, cellulose acetate.

The device for the reverse osmosis may preferably be driven under a pressure of 40 kg/cm$^2$ to 55 kg/cm$^2$ in view of the separation performance and treatment ability.

The oxidizing agent used in the oxidizing agent treatment used in this invention includes oxides of metals or nonmetals, oxide oxygen acids or salts thereof, peroxides, compounds containing organic oxygen, etc. The oxides may include nitrogen peroxide $NO_x$, chromic anhydride $CrO_3$, selenium dioxide $SeO_2$, manganese dioxide $MnO_2$, lead dioxide $PbO_2$, osmium tetraoxide $OsO_4$, silver oxide $Ag_2O$, cupric oxide $CuO$, mercury (II) oxide $HgO$, etc. The oxygen acids may include hot concentrated sulfuric acid $H_2SO_4$, nitrous acid $HNO_2$, nitric acid $HNO_3$, etc. The salts may include sodium hydrochlorite $NaOCl$, bleaching powder $CaOCl_2$, potassium dichromate $K_2CrO_7$, potassium chromate $K_2Cr_2O_4$, potassium permanganate $KMnO_4$, potassium chlorate $KClO_3$, potassium perchlorate $KClO_4$, etc. The peroxides may typically include hydrogen peroxide $H_2O_2$, sodium peroxide $Na_2O_2$, benzoyl peroxide $(C_6H_5COO)_2$, etc. There may be also included materials that can take two or more valences, for example, trivalent iron ions $Fe^{3+}$, divalent copper ions $Cu^{2+}$, lead tetracetate $Pb(CH_3CO_2)_4$, etc. Besides, Fenton's reagents ($Fe^{+++}H_2O_2$, etc.), dehydrogenation catalysts (Pt, Se, Zn), etc. can also be used as the oxidizing agent.

The electrolytic oxidation treatment used in this invention refers to a process in which a material is oxidized on an anode by electrolysis, and may be of any system utilizing increase in positive electric charges of positive ions, decrease in negative electric charges of negative ions, polymerization of negative ions, or increase in oxygen atoms or decrease in hydrogen atoms in a group of atoms. Such electrolytic oxidation treatment is advantageous over the oxidation by oxidizing agents in that a very strong oxidation can be achieved and less by-products may be formed.

The aeration treatment used in this invention is to promote oxidation by sending air to the condensate water of the photographic process waste liquor, and it is preferred to make air bubbles more minute by using a distributor or the like, whereby it can be achieved to improve the bubbling effect and also the efficiency for removal of organic solvents or the like can be enhanced.

The electrodialysis treatment used in this invention is to introduce the condensate water into a partitioned chamber of an electric dialysis tank comprising an anode and a cathode separated by a diaphragm, and passing an electric current to the electrodes.

The diaphragm may preferably be an ion exchange membrane. More preferably, the anode and cathode is separated by an anion exchange membrane and a cation exchange membrane, and the chamber comprises a cathode compartment, a plurality of concentrating compartments (compartments each partitioned with an anion exchange membrane at the cathode side and with a cation exchange membrane at the anode side), a plurality of desalting compartments (compartments each partitioned with a cation exchange membrane at the cathode side and with an anion exchange membrane at the anode side) and an anode compartment. The condensate water of the photographic process waste liquor may preferably be introduced into the desalting compartments, but may also preferably be introduced into the concentrating compartments. There is no particular limitation in the electrolytic solution to be introduced in the concentrating compartments and the cathode compartment, and may preferably be used a 0.1 to 0.2N solution such as sodium sulfite, sodium sulfate, sodium chloride, potassium sulfate and sodium thiosulfate. In this occasion, a processing solution having fixing ability (a bleach-fixing solution or a fixing solution) or its waste liquor may very preferably be used as the electrolytic solution introduced in the anode compartment as an electrolyte solution may thereby become unnecessary.

The redistillation treatment used in this invention is to apply a distillation treatment to the concentrated liquor obtained from the photographic process waste liquor, and this is one of the so-called rectification operations. There may be employed either batch distillation (including simple distillation and batch rectification) or continuous distillation, and may also be employed continuous equilibrium distillation against continuous rectification. Obtaining pure water (one having extremely less fractions other than the water) can afford to effectively feed water to the photographic processing solutions. It is also advantageous to use a suitable separating agent in azeotropic distillation and extractive distillation. In this invention, the secondary treatment effect can also be obtained by the so-called steam distillation. In respect of the pressure for operation, available are any of high pressure distillation, atmospheric distillation, vacuum distillation and molecular distillation.

The ion exchange resin treatment used in this invention can be carried out by bringing every sort of ion exchange resin into contact with the photographic process waste liquor, and usable ion exchange resin are those in which a functional group is combined to a three-dimensionally polycondensed polymeric substrate, and include cation exchange resin, anion exchange resin, chelate resin, adsorption resin, etc.

With regard to examples of chemical structure or methods of use of the ion exchange resin that can be preferably used in this invention, reference can be made to the disclosure in Japanese Unexamined Patent Publication No. 4051/1986 (in particular, pages 54 to 57).

The pH-adjusting treatment used in this invention is to adjust the pH of the condensate water to around neutrality by adding, in most general instances, a pH adjustor, and there is added acid or alkali depending on the pH of the condensate water. The condensate water, which usually contain ammonia, is alkaline, and used are acids, for example, inorganic acids such as sulfuric acid, hydrochloric acid, phosphoric acid, boric acid and sulfamic acid, carboxylic acids such as acetic acid, oxalic acid, citric acid, malonic acid and tartaric acid, and aminopolycarboxylic acids such as ethylenediamine-tetraacetic acid and nitrilotriacetic acid, as well as acidic salts such as sodium hydrogensulfate and ammonium sulfate.

In this invention, part of the vapor that was not condensed by the cooling and condensing means may desirably be discharged to the outside through a gas-treating column connected to the open air. This can prevent harmful gas from being turned to vapor to leak outside, owing to slight decomposition of the photographic process waste liquor at the time of the evaporation treatment, or prevent harmful gas from being made liable to leak out as the evaporation vessel may be brought into a pressurized state.

Moreover, when this treatment apparatus was stopped, the vapor or gas expanded by the heating of the inside of the evaporation vessel shrinks to bring it into a vacuum state, so that it may also occur that the evaporation vessel is broken because of the load if kept in a perfectly hermetical state. This gas-treating column makes it possible to prevent these as air is led in from the outside. In the gas-treating column, there may be used, for example, adsorbents or deodorizers such as activated carbon and zeolite. These absorbents or deodorizers are required to have a property to pass gases, and therefore may preferably be granular materials, including those having a grain size in the range of from 0.3 mm to 15 mm, and particularly preferred are adsorbents or deodorizers having a grain size of from 0.8 mm to 6 mm.

These adsorbents or deodorizers may be provided in the gas-treating column by using those packed in cloth, paper or the like and worked into a shape, whereby the trouble at the time of replacement can be saved preferably.

In this invention, the concentrated liquor obtained after the concentration by evaporation may be discharged out of the evaporation vessel, or, for example, a thermoresistant and chemical-resistant bag may be provided to the evaporation vessel and the concentrated liquor may be taken out together with the bag after the treatment. In instances in which the concentration-by-evaporation treatment apparatus of this invention comprises, for example, the concentration-by-evaporation treatment apparatus described in Japanese Unexamined Patent Publication No. 201442/1987 and Japanese Patent Application No. 288328/1986, the concentrated liquor can be taken out from a bottom part of the evaporation vessel in, for example, a thermoresistant and chemical-resistant bag through a device utilizing a rotary screw pump or through a valve. The thermoresistant and chemical-resistant bag may preferably be made of, for example, carbon fiber, aramid fiber, Teflon resin fiber, flax, glass fiber, polyethylene foam, polypropylene foam, etc.

In this invention, the concentrated liquor of the photographic process waste liquor may preferably be collected after it has been absorbed in a carrier and treated into a solid.

This carrier may include liquid-absorptive resins and solidifying materials. The carrier used in this invention may preferably be those capable of absorbing the concentrated liquor of the photographic process waste liquor and free from dropping of liquid when this liquid absorptive carrier having absorbed the liquid is carried, and preferably used is the so-called liquid-absorptive resin. This liquid-absorptive resin that can be used may include the following:

Seed polysaccharide, seaweed polysaccharide, resin polysaccharide, fruit polysaccharide and root polysaccharide.

Also, zansane gum, zanflow, guardrane, succinoglucan, cyzofinran, bluran, gelatin, casein, albumin, shellac, etc.

Starch derivatives, guar gum, derivatives of locust bean gum, cellulose derivatives, alginic acid derivatives, vinyl compounds and acrylic compounds.

Other polyethylene oxides, etc.

Preferred examples of highly liquid-absorptive resins used in this invention are shown below.

(A) Grafted starch types:
(A-1) A starch/acrylonitrile graft polymer
(A-2) A starch/acrylic acid graft polymer The above (A-1) can be prepared by the process described in Japanese Unexamined Patent Publication No. 43395/1974 and U.S. Pat. No. 4,134,863, and the above (A-2) can be Publication No. 46199/1978.

(B) Acrylic types:
(B-1) A sodium polyacrylate type
(B-2) A vinyl alcohol/acrylic acid copolymer The above (B-2) can also be repeatedly used after natural drying or forced drying.

(C) Polymers having a repeating unit represented by the structural formula (I) or (II) shown below, or, more preferably, polymers having 10 to 70% by weight of the unit(s) (I) and/or (II) and copolymerized with other ethylenic unsaturated monomers:

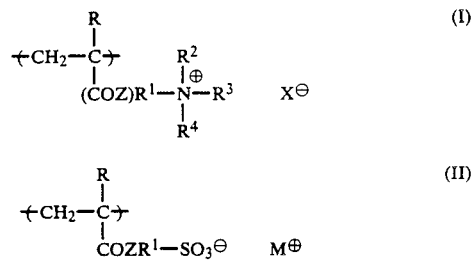

In the above, R represents a hydrogen atom, a methyl group or a halogen atom, Z represents an oxy group or an imino group; n is 0 or 1; R' represents an alkylene group having 1 to 6 carbon atoms (including a substituted alkylene group), a cycloalkylene group having 5 or 6 carbon atoms, an arylene group, an arylenealkylene group or an arylenebisalkylene group, provided that the above alkylene moiety has 1 to 6 carbon atoms and the above arylene moiety (that may be substituted) has 6 to 10 carbon atoms, including, for example, an arylene group substituted with a hydrophilic polar group such as

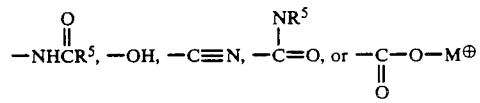

wherein R represents an alkyl group having 1 to 4 carbon atoms;

$R^2$, $R^3$ and $R^4$ each represent a hydrogen atom or an alkyl group having 1 to 6 carbon atoms, or forms a heterocyclic group together with N, which may also optionally contain a sulfur or oxygen atom; M represents a hydrogen atom, or an ammonium group containing a soluble cation or a quaternary ammonium cation having an alkyl group having 6 or less carbon atoms; and X represents an acid anion.

The halogen substituent for R can be bromine or chlorine; the alkylene group having 1 to 6 carbon atoms may be substituted with a hydroxyl group; the arylenealkylene group represented by $R^1$ includes a phenylenemethylene group, a phenyleneethylene group, a phenylenepropylene group and a phenylenebutylene group; and the arylenebisalkyl group represented by $R^1$ includes a phenylenedimethylene group.

The soluble cation represented by M includes sodium and potassium.

The heterocyclic group formed by $R^2$, $R^3$ and $R^4$ and a nitrogen atom with which these are combined includes pyridinium, imidazolium, oxazolium, thiazolium and morphorium.

The acid anion represented by X includes chlorides, bromides, acetates, p-toluenesulfonates, methanesulfonates, ethanesulfonates, methylsulfates, ethylsulfates and perchlorates.

The ethylenic unsaturated monomer copolymerized with the monomer of the above formula (I) and/or monomer of the above formula (II) comprises one or more monomers preferably having a cross-linkable group, for example, 2-hydroxyethyl methacrylate, 2-hydroxyethyl acrylate or a monomer containing an active methylene group. The copolymerizable ethylenic unsaturated monomers of this type are described, for example, in U.S. Pat. Nos. 3,459,790, 3,488,708, 3,554,987, 3,658,878, 3,929,482 and 3,939,130.

The polymer preferable for use in the above is derived from one or more kinds of monomers listed below so as to contain 10 to 70% by weight of these, or has repeating units of these:

2-Aminoethyl methacrylate hydrochloride;
N-(2-methacryloyloxyethyl)-N,N,N-trimethylammonium chloride;
N-(2-methacryloyloxyethyl)-N,N,N-trimethylammonium meto sulfate;
sodium 2-methacryloyloxyethyl-1 sulfonate; and
2-(N,N-dimethylamino)ethyl methacrylate hydrochloride.

The acid addition salt corresponding to the above structural formula (I) can be converted to a free amine when it is neutralized with a base.

The above polymers can be prepared by polymerizing suitable monomers in an aqueous solution according to a conventional method.

The monomer of the above structural formula (I) can be prepared by the methods described in R. H. Yocum and E. B. Nyqist, "Functional Monomers", Marcel Dekker Inc., New York (1974) and U.S. Pat. No. 2,780,604. The monomer of the above structural formula (II) can be prepared by the methods described in U.S. Pat. Nos. 3,024,221 and 3,506,707.

In some instances, this polymer can be prepared by (a) forming a polymer having an amine group into a quaternary compound or, alternatively, (b) reacting amine with a polymer having a group reactive with the amine, for example, an active halogen group. Such techniques are known in the present technical field, and described in U.S. Pat. Nos. 3,488,706 and 3,709,690 and Canadian Patent No. 601,958.

The resins set out in the above are commercially available. The commercially available products may include, for example, Smicagel N-100, Sumicagel SP-520, Sumicagel S-50, Sumicagel NP-1020, Sumicagel F-03, Sumicagel F-51, Sumicagel F-75 and Sumicagel R-30 (all of these are trade names; available from Sumitomo Chemical Co., Ltd.), Sunwet IM-300 and Sunwet IM-1000 (trade names; available from Sanyo Chemical Industries, Ltd.), Aquakeep 10SH-P (trade name; available from Seitetsu Kagaku Co., Ltd.), Langeel F (trade name; available from Japan Exlan Co., Ltd.), etc.

The liquid-absorptive resins preferably used in this invention may preferably have a shape suited for readily absorbing the liquid, and powdery ones or granular ones having a diameter of about 0.01 to 3 mm can be advantageously used in view of the readiness for handling.

The solidifying materials used as the carrier, used in this invention may be any of the materials that can solidify the concentrated liquor of the photographic process waste liquor, and may be accompanied, or may not be accompanied, with a chemical reaction when solidifying the same. Preferably used as the solidifying materials of this invention are, for example, CaO, Ca(OH)$_2$, CuCO$_3$, silica gel, calcium chloride, aluminum oxide, calcium sulfate, magnesium oxide, barium oxide, granular soda lime, diphosphorus pentoxide, etc.

The concentration-by-evaporation treatment apparatus of this invention may preferably has a repture disc in order to prevent occurring of an accident, for example, such that clogging occurs in the vapor discharging chamber for discharging the vapor formed by evaporation to pressurize the evaporation vessel. The repture disc is so constituted, for example, that it connects the evaporation vessel and the waste liquor feeding tank and that this connecting pipe may be intercepted by means of a sheet made of polyethylene or the like capable of being broken by application of pressure.

The concentration-by-evaporation treatment apparatus of this invention may preferably have a temperature sensor in the evaporation vessel. The apparatus may be so constituted that the heating means turns to off when the temperature sensor detects a temperature not lower than a certain degree, for example, a temperature of 120° C. or higher, whereby there can be prevented liquid-empty heating.

The concentration-by-evaporation treatment apparatus of this invention may preferably be so constituted that a door provided on the apparatus can not be opened unless the temperature inside the evaporation vessel or the temperature in the treatment apparatus reaches a certain degree or lower (for example, 50° C. or lower), or so constituted that a warning signal is given when someone trys opening the door.

When the waste liquor is treated by the concentration-by-evaporation treatment apparatus of this invention, color negative photographic film waste liquor and color paper photographic process waste liquor may be treated separately or a mix of these may be treated. The waste liquor may be treated on the same treatment line or in a separate manner for each tank, or a mix of a plural or all kinds of the waste liquor may be treated.

The concentration-by-evaporation treatment apparatus of this invention may preferably be provided with a means for reducing the pressure in the evaporating vessel, as this can lower the temperature in the evaporation vessel, whereby there may be generated less ill-smelling gas or harmful gas. Also on the same treatment line, the waste liquor in each tank may be separately treated or a mix of a plural or all kinds of the waste liquor may be treated.

Next, typical examples of the photographic processing solutions on which the treatment according to this invention can be carried out will be described in detail. Provided that, in the following, chiefly described are photographic processing solutions used when the photographic materials to be processed are those used for color photography. Almost of all of the photographic process waste liquor are the overflow solutions coming when a light-sensitive silver halide color photographic material is processed by use of these photographic processing solutions.

A color developing solution is a processing solution used in the step of color development processing (i.e., a step of forming a color image, specifically a step of forming a color image by the coupling reaction between an oxidized product of a color developing agent and a color coupler). Accordingly, in usual instances, it is necessary in the step of color development processing to incorporate the color developing agent in the color developing solution, but included here is to incorporate the color developing agent in the color photographic material and carry out the processing with use of a color developing solution or alkali solution (activator solution) containing the color developing agent. The color developing agent contained in the color developing solution is an aromatic primary amine color developing agent, including derivatives of aminophenol types and p-phenylenediamine types.

The above aminophenol type developing agent may include, for example, o-aminophenol, p-aminophenol, 5-amino-2-oxy-toluene, 2-amino-3-oxy-toluene and 2-oxy-3-amino-1,4-dimethyl-benzene.

The color developing solution may contain an alkali agent usually used in developing solutions, and may also contain various additives, for example, benzyl alcohol and a halogenated alkali metal, or a development controlling agent and a preservative. It may also further contain every sort of an anti-foaming agent or surface active agent, and an organic solvent such as methanol, dimethylformamide or dimethylsulfoxide.

The color developing solution may also contain an antioxidant if necessary. In the color developing solution, various chelating agents may also be further used in combination, as a sequestering agent.

A bleach-fixing solution is a solution used in a step of bleach-fixing (a step of oxidizing a metallic silver formed by development to convert it to a silver halide, and then forming a water soluble complex and at the same time effect dye formation at a non-colored portion of a coupler. As to the bleaching agent used in the bleach-fixing solution, any type of agent may be used.

The bleach-fixing solution may also contain every kind of pH buffering agent alone or in combination of two or more kinds. It may still also contain every kind of brightening agent, anti-foaming agent or surface active agent. It may also appropriately contain a preservative such as bisulfite addition products, an organic chelating agent such as aminopolycarboxylic acid, a stabilizer such as nitroalcohol and nitric acids, and an organic solvent. There may be further added in the bleach-fixing solution any of various bleaching accelerators described in Japanese Unexamined Patent Publications Nos. 280/1971, 8506/1970 and 556/1971, Belgian Patent No. 770,910, Japanese Patent Publications Nos. 8836/1970 and 9854/1978, Japanese Unexamined Patent Publications Nos. 71634/1979 and 42349/1974, etc.

In this invention, a function of washing-substitutive stabilizing processing may be combined, whereby the quantity of the waste liquor from the processing can be reduced preferably.

A stabilizing solution includes stabilizing solutions having a function of stabilizing a color image and a function as a hydro-extracting bath for preventing stains such as washing non-uniformity. Besides, a color controlling solution for coloring the color image and an antistatic solution containing an antistatic agent are also included in these stabilizing solutions. When bleach-fixing components are brought into the stabilizing solution from a previous bath, measures are taken to neutralize, desalt and inactivate these so as not to deteriorate the storage stability of dyes.

Components contained in such a stabilizing solution include chelating agents having a stability constant to iron ions, of 6 or more (particularly preferably 8 or more). These chelating agents include organic carboxylic acid chelating agents, organic phosphoric acid chelating agents, polyhydroxyl compounds, inorganic phosphoric acid chelating agents, etc. Particularly preferable for the effect of this invention are diethylenetriaminepentaacetic acid, 1-hydroxyethylidene-1,1-diphosphonic acid, and salts of these. These compounds may preferably be used generally in concentration of about 0.1 g to 10 g per liter of the stabilizing solution, more preferably about 0.5 g to 5 g per liter of the stabilizing solution.

The compounds added in the stabilizing solution include ammonium compounds. These are supplied by ammonium salts of various inorganic compounds, and specifically include ammonium hydroxide, ammonium bromide, ammonium carbonate, ammonium chloride, ammonium hypophosphite, ammonium phosphate, ammonium phosphite, ammonium fluoride, acid ammonium fluoride, ammonium fluoroborate, ammonium arsenate, ammonium hydrogencarbonate, ammonium hydrogen fluoride, ammonium hydrogensulfate, ammonium sulfate, ammonium iodide, ammonium nitrate, ammonium pentaborate, ammonium acetate, ammonium adipate, ammonium lauryltricarboxylate, ammonium benzoate, ammonium carbamate, ammonium citrate, ammonium diethyldithiocarbamate, ammonium formate, ammonium hydrogenmalate, ammonium hydrogenoxalate, ammonium hydrogenphthalate, ammonium hydrogentartarate, ammonium lactate, ammonium malate, ammonium maleate, ammonium oxalate, ammonium phthalate, ammonium pirate, ammonium pyrolidinedithiocarbamate, ammonium salicylate, ammonium succinate, ammonium sulfanilate, ammonium tartalate, ammonium thioglycolate, 2,4,6-trinitrophenol ammonium, etc. These ammonium compounds may be used in an amount ranging from 0.05 to 100 g per liter of the stabilizing solution.

Other compounds added in the stabilizing solution may include pH adjusters, mildew-proofing agents such as 5-chloro-2-methyl-4-isothiazolin-3-one, 2-octyl-4-isothiazolin-3-one and 11 -2-benzisothiazolin-3-one, as well as those described in Japanese Unexamined Patent Publication No. 43741/1986 (pages 26 to 30), preservatives such as water-soluble metallic salts, dispersing agents such as ethylene glycol, polyethylene glycol and polyvinyl pyrrolidone (PVP K-15, Rubiscol K-17), hardening agents such as formalin, brightening agents, etc.

Particularly in this invention, particularly preferably used is a washing-substitutive stabilizing solution containing any of the above mildew-proofing agents as there may be produced less tar in the evaporation treatment apparatus when they are used.

In instances in which the light-sensitive materials to be processed are those for use in negatives, an aldehyde derivative may be added in this stabilizing solution for negatives, for the purpose of improving the storage stability of photographic images.

In the above stabilizing solution for negatives, all sorts of additives, for example, a droplet irregularity preventive material, a pH adjuster, a hardening agent, an organic solvent, a moisture conditioner, and besides these, a color-toning agent, etc. may be added if necessary, which are additives for improving and expanding the effect of processing.

The stabilizing treatment carried out in this invention by using the washing-substitutive stabilizing solution is not a conventional processing in which a large quantity of running water is used to wash away the processing solution of a previous stage that has been adhered to or impregnated into a light-sensitive photographic material, but a processing that can have a function equal or superior to the above by making replenishment in the stabilizing solution in an amount of as small as 30 ml/m$^2$ to 9,000 ml/m$^2$, preferably 60 ml/m$^2$ to 3,000 ml/m$^2$, per unit area. Specifically, this refers to the process as described in Japanese Unexamined Patent Publication No. 134636/1983.

Accordingly, it is not required to provide feeding-/discharging pipe for the washing to the outside of the automatic processing machine as in conventional cases.

A stilbene type brightening agent may also be used in the color developing solution for color paper and the stabilizing solution.

Components contained in the waste liquor in the above color developing solution are the above various components or additives and the components or the like eluted and accumulated from the photographic materials to be processed.

Components contained in the waste liquor of the above bleach-fixing solution and stabilizing solution are the above various components or additives and the components or the like eluted and accumulated from the photographic materials to be processed.

The concentration-by-evaporation treatment apparatus of this invention can be effective when the waste liquor comprises the photographic process waste liquor and contains thiosulfate, sulfite and ammonium salt in large amounts, and particularly effective when it contains organic acid ferric complex salt and thiosulfate.

As a preferred example of applying this invention, this invention is suited for an instance in which the photographic process waste liquor produced with the development processing of light-sensitive photographic materials by use of an automatic processing machine is treated inside the automatic processing machine or in the vicinity thereof. The automatic processing machine will be described here.

In FIG. 1, the automatic processing machine is denoted by the numeral 100. The automatic processing machine shown therein is of a system in which a rolled light-sensitive photographic material F is continuously guided to a color developing tank CD, a bleach-fixing tank BF and a stabilizing tank Sb to effect photographic processing, and rolled up after drying D. The numeral 101 denotes replenishing solution tanks. The photographic processing amount of the light-sensitive photographic material F is detected by a sensor 102, and replenishing solutions are supplied in the respective processing tanks through a controlling device 103 according to the detected information.

Once the replenishing solutions are supplied to the respective photographic processing tank, overflowed waste liquor is discharged from the processing tanks and collected in a stock tank 104. As a means for moving the overflowed photographic process waste liquor to the stock tank 104, a simple method is to allowing it to naturally drop through a guide tube. In some instance, it can be forcedly transported by means of a pump or the like.

Also, as described above, components are different in the photographic process waste liquor in each of the photographic processing tanks CD, BF and Sb, but it is preferred to carry out the treatment at one time by mixing all the photographic process waste liquors.

Figure 2:
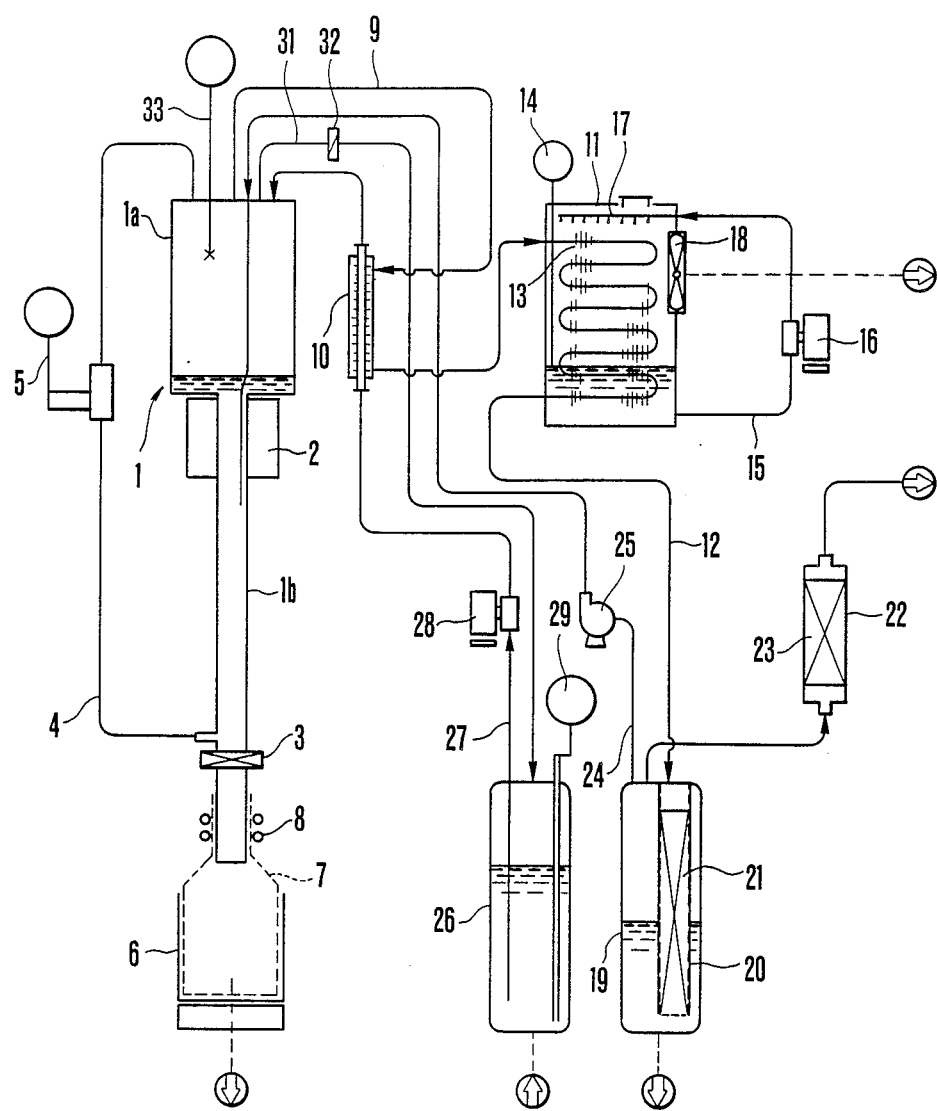
FIG. 2 is a schematic constitutional illustration showing an example of this invention.
Figure 3:
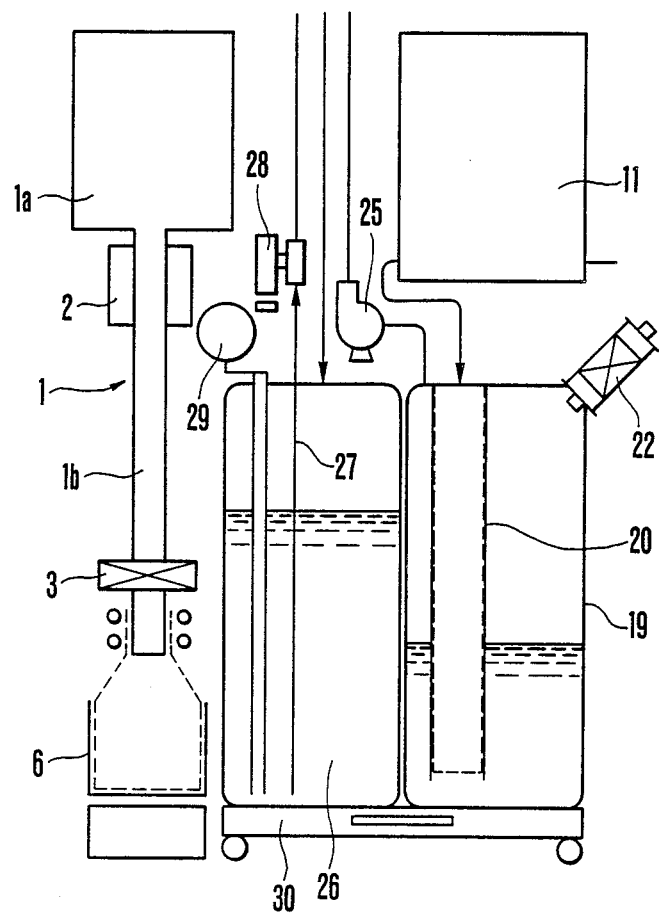
FIG. 3 is a constitutional illustration showing its specific disposal of the example shown in FIG. 1.

FIG. 2 is a schematic constitutional illustration showing more specifically the apparatus of this invention, for treating the photographic process waste liquor through concentration by evaporation, and FIG. 3 is a constitutional illustration showing specifically the disposal thereof.

In the figures, the numeral 1 denotes an evaporation vessel, composed of a cylindrical upper section 1a having a larger diameter and a cylindrical lower section 1b having a smaller diameter, and provided at an upper part of the lower section 1b with a heating means and at a lower part thereof with a ball valve 3. From a somewhat upper part than the ball valve 3, a connecting pipe 4 connecting to the upper section 1a extends, on the way of which a liquid level sensor 5 is provided. Below the lower section 1b of the evaporation vessel 1, a sludge receptacle 6 is provided, and a bag 7 made of polypropylene is fixed in its inside by means of o-rings 8.

On the upper section 1a of the evaporation vessel 1, provided is a vapor discharging pipe 9, and this vapor discharging pipe 9 is connected to a stored liquid lead-in pipe 12 through a heat exchanger 10 and a cooling and condensing means 11. In the cooling and condensing means 11, a large number of a cooling heat-dissipation plates 13 (illustrated with partial omission) are provided on the vapor discharging pipe 9 and a liquid level sensor 14 is further provided. At a lower part of the cooling and condensing means 11, a cooling water lead-in pipe 15 is provided, and connected through a cooling water circulating pump 16 to a shower pipe 17 bored with a large number of small holes.

The air inside the cooling and condensing means 11 is released outside the treatment apparatus by means of a cooling fun 18. The stored liquid lead-in pipe 12 is connected to a stored liquid tank 19, provided that in the inside of this tank an activated carbon cartridge 20 is provided, and in its inside contained is activated carbon packed in a paper bag. Another activated carbon cartridge 22 is further provided outside the stored liquid tank 19, and in its inside contained is activated carbon packed 23 in a paper bag. In the stored liquid tank 19, also provided is an air lead-in pipe 24, which is set into the waste liquor in the evaporation vessel 1 though an air pump 25. The numeral 26 denotes a waste liquor feeding tank, provided with a waste liquor lead-in pipe 27 and connected to the upper section 1a of the evaporation vessel through the heat exchanger 10. On the waste liquor feeding tank 26, also provided is a liquid level sensor 29. The waste liquor feeding tank 26 and the stored liquid tank 19 are set on a pedestal 30 as shown in FIG. 3, having handgrips and capable of being pulled out.

Further provided on the upper section 1a of the evaporation vessel 1 is a guide pipe 31, which is connected to the waste liquor feeding tank 26 though a plunger disc 32, and a temperature sensor 33 is also provided on the upper section 1a of this evaporation vessel 1.

Next, the process of carrying out the heating and evaporation treatment will be schematically described below.

The waste liquor feeding tank 26 in which about 20 lit. of overflow liquid from the automatic processing machine is conveyed to the concentration-by-evaporation treatment apparatus and set on the pedestal 30 pulled out, and the waste liquor feeding pipe 27 and the liquid level sensor 29 are connected. The stored liquid tank 19 beforehand provided with the activated carbon cartridges 20 and 22 packed with the activated carbon 21 and 23 respectively packed in paper bags is further set on the pedestal 30, and, after connection of the stored liquid lead-in pipe 12 and the air lead-in pipe 24, put back to the inside of the concentration-by-evaporation treatment apparatus.

Subsequently, the bag 7 made of polypropylene is set in the sludge receptacle 6 provided below the lower section 1b of the evaporation vessel 1, and fixed to the lower section 1b of the evaporation vessel 1 by means of two o-rings 8. Next, after feeding of water into the cooling and condensing means 11, the apparatus is switched on, and the air pump 25 is actuated and also the air in the stored liquid tank 19 is led into the evaporation vessel 1 through the air lead-in pipe 24, provided that the lead end of the air discharging pipe 9 is positioned further lower than the heating means 2 provided outside the evaporation vessel 1. Next, the cooling fun 18, cooling water circulating pump 16 is actuated in this order, whereby the stored water is circulated in such a way that it is fed on the shower pipe 17 or on the heat dissipation plates 13 of the vapor discharging pipe 9 kept in the cooling and condensing means 11 through the cooling water lead-in pipe 15, and again stored at the lower part of the cooling and condensing means 11.

Subsequently, the bellows pump 28 is actuated, and the waste liquor in the waste liquor feeding tank 26 passes the heat exchange means 10 through the waste liquor lead-in pipe 27, thereafter being fed into the evaporation vessel 1. The quantity of the waste liquor in the evaporation vessel 1 increases and the liquid level in the connecting pipe 4 increases. Once the liquid level is detected by the liquid level sensor 5 for more than, for example, 3 seconds, the bellows pump 28 stops working and at the same time the heating means 2 is switched on, so that the concentration by evaporation is started. The concentration by evaporation decreases the liquid quantity of the waste liquor in the evaporation vessel 1 to lower the liquid level in the connecting pipe 4. Once the liquid level turns not to be detected by the liquid level sensor 5 for more than 3 seconds, the bellows pump 28 is again switched on, and the waste liquor in the waste liquor feeding tank 26 is fed into the evaporation vessel 1. This operation is repeated. The vapor formed by evaporation passes the vapor discharging pipe 9, and, after heat exchange with the waste liquor, it is condensed through the cooling and condensing means 11, so that the condensate water passes the stored water lead-in pipe 12 to enter into the stored liquid tank 19 and passes the activated carbon 21 in the activated carbon cartridge 20, and thereafter stored in the stored liquid tank 19.

Once the liquid level sensor 29 detects that the waste liquor in the waste liquor feeding tank 26 ran short, the bellows pump 28 stops working, the heating means 2 is switched off, the cooling water circulating pump 18 and the fan for cooling are stopped after 2 hours, a lamp is turned on and a buzzer also sounds to notify that the concentration-by-evaporation treatment has been completed, and at the same time the air pump 25 stops. At this time, the ball valve 3 is opened to allow a sludge in the evaporation vessel 1 to drop in the bag 7 made of polypropylene, and thereafter the bag is taken out by releasing the o-rings 8.

Also, when the liquid level sensor 14 detects that the stored water in the cooling and condensing means 11 in the course of the concentration by evaporation, a lamp is turned on and a buzzer also sounds to notify that the stored water ran short.

Similarly, in the course of the concentration by evaporation, when the temperature sensor 33 detects that the temperature in the evaporation vessel raised to 120° C. because of an extraordinary lowering of the liquid level for any reason, causing the liquid-empty heating, a lamp is turned on and a buzzer also sounds, and at the same time the heating means is switched off. Then, the concentration-by-evaporation treatment is discontinued by a series of the motions as described above.

Figure 4:
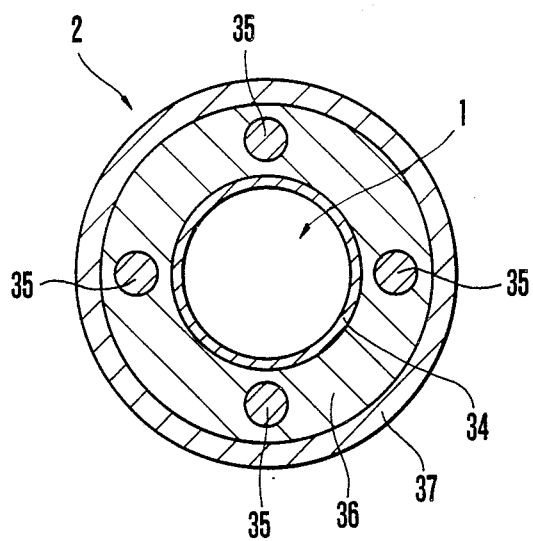
FIG. 4 is a cross-section of the heating means shown in FIG. 2 and FIG. 3.

FIG. 4 is a cross-section of the heating means 2 illustrated in FIG. 2 and FIG. 3. More specifically, there is provided on the periphery of a wall 34 of the evaporation vessel 1 made of titanium a heater block 36 made of SUS 304 stainless steel, and four cartridge heaters 35 are embedded in this heater block 36. A heat insulator 37 is also provided on the peripheral surface of the heater block 36.

FIG. 5 to FIG. 8 are views illustrating a variety of examples of the liquid level sensor of this invention.

Figure 5:
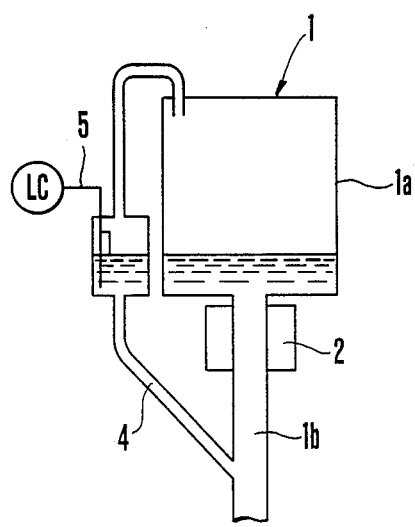
FIG. 5 to FIG. 8 are illustrations showing various embodiments of the liquid level sensor used in this invention.

In FIG. 5, the connecting pipe 4 extends upward from the lower section 1b of the evaporation vessel at the lower part of the heating means 2 with an angle of about 45 degrees to the wall of the evaporation tank 1, and the liquid level sensor 5 is provided on the way of this connecting pipe 4.

Figure 6:
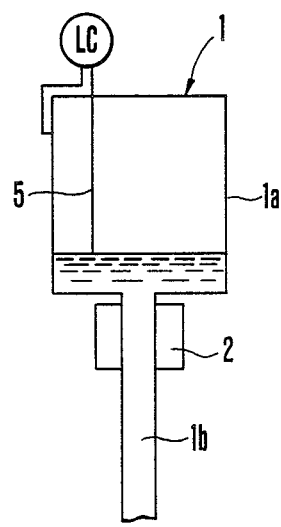

In FIG. 6, the liquid level sensor 5 is directly set inside the upper secion 1a of the evaporation vessel 1, and one terminal is earthed to a wall of the upper section 1a of the evaporation vessel 1.

Figure 7:
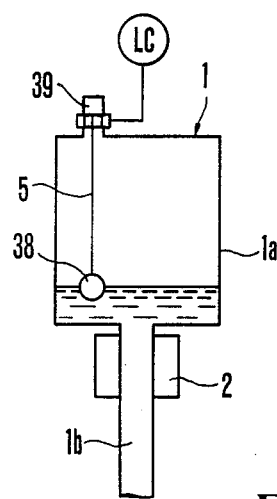

In FIG. 7, a lower part of the liquid level sensor 5 is comprised of a float 38, and a magnet 39 is provided on an upper part of the liquid level sensor 5. Thus, a switch turns off when the part at which the magnet 39 is set is elevated by elevation of the liquid level.

Figure 8:
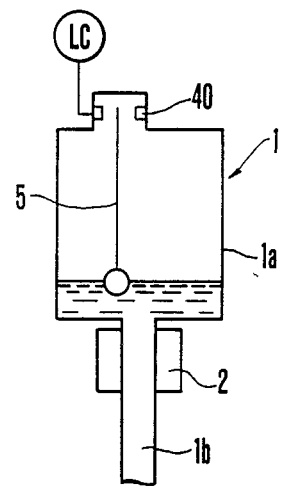

In FIG. 8, a lower part 1b of the liquid level sensor 5 is similarly comprised of the float 38. When the liquid level is elevated, an upper part of the liquid level sensor 5 intercepts infrared rays emitted from an infrared emitter 40 and the switch turns off.

Figure 9:
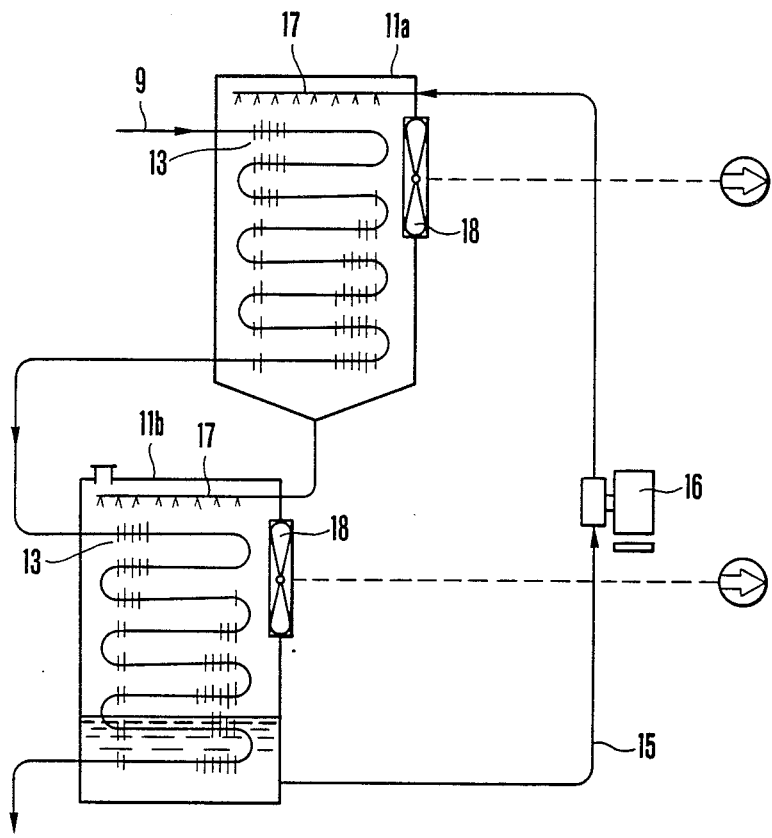
FIG. 9 to FIG. 11 are schematic constitutional illustrations of the principal part, showing other examples.
Figure 10:
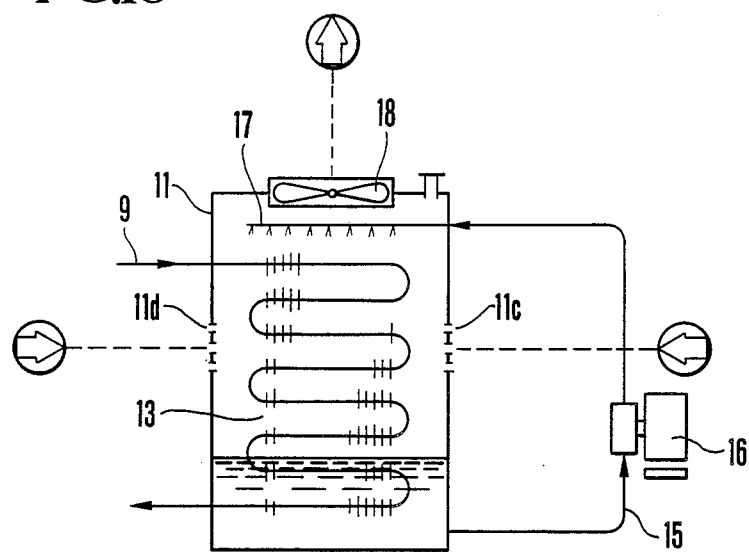
Figure 11:
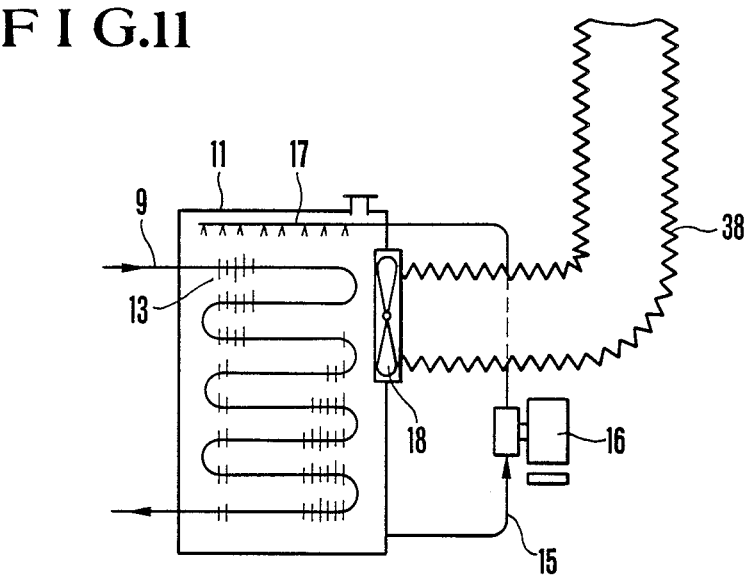

FIG. 9 to FIG. 11 are view illustrating other examples of the means for cooling and condensing the vapor, of this invention.

In FIG. 9, the cooling and condensing means are provided in a duplex fashion to comprise an upper cooling and condensing means 11a and a lower cooling and condensing means 11b, and the stored water is held at the lower part of the lower cooling and condensing means 11b. This water is sent to the shower pipe 17 provided at an upper part of the upper cooling and condensing means 11a, through the cooling water lead-in pipe 15 by means of the cooling water circulating pump 16, fed on the vapor discharging pipe 9 provided with the air cooling heat dissipation plates 13, and thereafter sent to the shower pipe 17 at the upper part of the lower cooling and condensing means 11b. Similarly, it is fed on the vapor discharging pipe 9, and thereafter returns to the stored water tank at the lower part.

In FIG. 10, there is illustrated an example in which the air cooling fan 18 is provided at an upper part. The air is led in from both sides 11c and 11d of the cooling and condensing means 11, and discharged outside the concentration-by-evaporation treatment apparatus through the air cooling fan 18.

In FIG. 11, there is illustrated an example in which a duct 38 is provided at the outside of the air cooling fan 18. In this instance, the means for feeding water does not function. In this manner, the apparatus may be constituted such that no water is fed when it is possible to set the duct and the water can be fed when it is impossible to set the duct.

EXAMPLES

After imagewise printing on a commercially available color photographic paper, continuous processing was carried out with use of the following processing steps and processing solutions.

| Standard processing steps: | | |
|---|---|---|
| (1) Color developing | 38° C. | 3 min. |
| (2) Bleach-fixing | 38° C. | 1 min. 30 sec. |
| (3) Stabilizing | 25° C. to 35° C. | 3 min. |
| (4) Drying | 75° C. to 100° C. | about 2 min. |

| Composition of processing solutions: | |
|---|---|
| [Color developing tank solution] | |
| Benzyl alcohol | 15 ml |
| Ethylene glycol | 15 ml |
| Potassium sulfite | 2.0 g |
| Potassium bromide | 1.3 g |
| Sodium chloride | 0.2 g |
| Potassium carbonate | 24.0 g |
| 3-Methyl-4-amino-N-ethyl-N-(β-methanesulfonamidoethyl)aniline sulfate | 4.5 g |
| Brightening agent (a 4,4'-diaminostilbenedisulfonic acid derivative) | 1.0 g |
| Hydroxylamine sulfate | 3.0 g |
| 1-Hydroxyethylidene-1,1-diphosphonic acid | 0.4 g |
| Hydroxyethyliminodiacetic acid | 5.0 g |
| Magnesium chloride.hexahydrate | 0.7 g |
| Disodium 1,2-dihydroxybenzene-3,5-disulfonate | 0.2 g |
| Made up to 1 liter by adding water, and adjusted to pH 10.20 using potassium hydroxide and sulfuric acid. | |
| [Color developing replenishing solution] | |
| Benzyl alcohol | 20 ml |
| Ethylene glycol | 20 ml |
| Potassium sulfite | 3.0 g |
| Potassium carbonate | 24.0 g |
| Hydroxylamine sulfate | 4.0 g |
| 3-Methyl-4-amino-N-ethyl-N-(β-methanesulfonamidoethyl)aniline sulfate | 6.0 g |
| Brightening agent (a 4,4'-diaminostilbenedisulfonic acid derivative) | 2.5 g |
| 1-Hydroxyethylidene-1,1-diphosphonic acid | 0.5 g |
| Hydroxyethyliminodiacetic acid | 5.0 g |
| Magnesium chloride.hexahydrate | 0.8 g |
| Disodium 1,2-dihydroxybenzene-3,5-disulfonate | 0.3 g |
| Made up to 1 liter by adding water, and adjusted to pH 10.70 using potassium hydroxide and sulfuric acid. | |
| [Bleach-fixing tank solution] | |
| Ethylenediaminetetraacetic acid ferric ammonium dihydrate | 60.0 g |
| Ethylenediaminetetraacetic acid | 3.0 g |
| Ammonium thiosulfate (a 70% solution) | 100 ml |
| Ammonium sulfite (a 40% solution) | 27.5 ml |
| Made up to 1 liter as a whole by adding water, and adjusted to pH 7.1 using potassium carbonate or glacial acetic acid. | |
| [Bleach-fixing replenishing solution A] | |
| Ethylenediaminetetraacetic acid ferric ammonium dihydrate | 260.0 g |
| Potassium carbonate | 42.0 g |
| Made up to 1 liter as a whole by adding water. | |
| The pH of this solution is adjusted to 6.7 ± 0.1 with use of acetic acid or ammonia water. | |
| [Bleach-fixing replenishing solution B] | |
| Ammonium thiosulfate (a 70% solution) | 500.0 ml |
| Ammonium sulfite (a 40% solution) | 250.0 ml |
| Ethylenediaminetetraacetic acid | 17.0 g |
| Glacial acetic acid. | 85.0 ml |
| Made up to 1 liter as a whole by adding water. | |
| The pH of this solution is adjusted to 5.3 ± 0.1 with use of acetic acid or ammonia water. | |
| [Washing-substitutive stabilizing tank solution and replenishing solution] | |
| Ethylene glycol | 1.0 g |
| 2-Methyl-4-isothiazolin-3-on | 0.20 g |
| 1-Hydroxyethylidene-1,1-diphosphonic acid (a 60% solution) | 1.0 g |
| Ammonia water (a 25% aqueous solution of ammonium hydroxide) | 2.0 g |
| Made up to 1 liter using water, and adjusted to pH 7.0 using 50% sulfuric acid. | |

EXAMPLE 1

An automatic processing machine was filled in the tanks with the above color developing tank solution, bleach-fixing tank solution and stabilizing tank solution to carry out a running test while processing a sample of the above commercially available color photographic paper and while supplying the above color developing replenishing solution, bleach-fixing replenishing solutions A and B and stabilizing replenishing solution through a bellows pump at intervals of 3 minutes. The amount for replenishing was such that the color developing tank was replenished in an amount of 190 ml, of the bleach-fixing tank was replenished in an amount of 50 ml for each of the bleach-fixing replenishing solutions A and B, and the stabilizing tank was replenishing with the washing-substitutive stabilizing replenishing solution in an amount of 250 ml, each per 1 m$^2$ of the color photographic paper. The stabilizing tank in the automatic processing machine was comprised of stabilizing tanks comprising a first to third tanks in the direction of the flow of the sample, wherein the replenishing was carried out from the last tank, the solution overflowed from the last tank was flowed into the tank anterior thereto and further the solution overflowed therefrom was flowed into the tank further anterior thereto, taking the multi-tank counter-current system.

The continuous processing was carried out until the total replenishing amount of the washing-substitutive stabilizing solution reaches 3 times of the capacity of the stabilizing tank.

Provided that 400 g of potassium carbonate were previously dissolved in the photographic process waste liquor and 500 g of sodium hydrogensulfate were projected into the stored liquid tank. Also used were heater blocks having different length, and the heat density of the heating means was varied as in Table 1. In addition, in order to confirm the effect of blowing air into the waste liquor in the evaporation vessel, the air pump was switched on or off Table 1. An anti-foaming agent FS Antifoam 025 (trade name; available from Dow-Corning Corp.) in amount of 4 g was also previously added in the photographic process waste liquor as occasion demands as shown in Table 1, to lower the surface tension to the ranges of 19 dyne/cm to 26 dyne/cm.

Measured was the time required for the photographic process waste liquor in the evaporation vessel to be blown into the vapor lead-in pipe because of bumping after the start button was pushed, and also observed was ill smell generated from the apparatus. Results obtained are shown in Table 1.

TABLE 1

| Test No. | Heat density (kcal/cm$^2$) | Air pump | Anti-foaming agent | Time taken before spouting | Smell |
|---|---|---|---|---|---|
| 1 (Comp. Exa.) | 20 | On | Present | 1 hr. | D |
| 2 (Comp. Exa.) | 20 | Off | None | 1 hr. | D |
| 3 (Comp. Exa.) | 18 | Off | None | 1 hr. 30 min. | D |
| 4 (This inve.) | 17.2 | Off | None | 5 hr. | C |
| 5 (This inve.) | 0 | Off | None | 5 hr. 30 min. | C |
| 6 (This inve.) | 8.6 | Off | None | 7 hr. | B |
| 7 (This inve.) | 4 | Off | None | 8 hr. | B |
| 8 (This inve.) | 4 | On | None | 12 hr. | A |
| 9 (This inve.) | 4 | Off | Present | 10 hr. | B |
| 10 (This inve.) | 4 | On | Present | No spouting till completion of | A |

TABLE 1-continued

| Test No. | Heat density (kcal/cm$^2$) | Air pump | Anti-foaming agent | Time taken before spouting treatment | Smell |
|---|---|---|---|---|---|

Symbols used in Table 1 to represent the evaluation on the ill smell means the following evaluation:
D: Seriously ill-smelling.
C: Slightly ill-smelling.
B: Very slightly ill-smelling, but so slightly that no one becomes aware of the smell without careful smelling.
A: No ill-smelling at all.

As will be clear from Table 1, it is understood that if the heat density becomes more than about 17.2 kcal/cm$^2$, the bumping takes place as the concentration proceeds, but the controlling of the heat density to about 17.2 kcal/cm$^2$ or less makes the bumping hard to occur. There also was no effect at all of blowing the air or adding the anti-foaming agent when the heat density becomes more than about 17.2 kcal/cm$^2$, but, particularly in Test No. 10 in which the blowing of air and addition of the anti-foaming agent were employed together, no spouting of the photographic process waste liquor in the evaporation vessel by bumping occurred until the concentration by evaporation was completed (after 17 hours).

As described above, the invention of Example 1, in which the heat density of the heating means is controlled to about 17.2 kcal/cm$^2$ or less, can suppress the generation of ill-smelling and harmful gas and at the same time prevent occurring of the accident such as bumping when the photographic process waste liquor is heated, and moreover has the advantages such that the heating efficiency is good, the evaporation efficiency is good, the energy cost can be saved, and the apparatus can be made compact.

EXAMPLE 2

Example 1 was repeated except for the modification made as follows:

In the photographic process waste liquor 400 g of potassium carbonate were previously dissolved, and 500 g of sodium hydrogensulfate were projected into the stored liquid tank. The heat density of the heating means was controlled to about 4 kcal/cm$^2$. An anti-foaming agent FS Antifoam 025 (trade name; available from Dow-Corning Corp.) in amount of 4 g was also previously added in the photographic process waste liquor. The waste liquor in amount of 20 lit. was treated and cooled. Thereafter, the ball valve at the lower part of the evaporation vessel was opened to take out a sludge present in the evaporation vessel, which was found to be in amount of 1.2 lit.

Next, prepared was a concentration-by-evaporation treatment apparatus outside this invention, the photographic process waste liquor was similarly treated. This concentration-by-evaporation treatment apparatus has basically the same structure with the concentration-by-evaporation treatment apparatus according to this invention (Example 11) of this invention as shown in FIG. 2 to FIG. 4, but the bellows pump is not so constituted that it may be switched on or off for its operation respectively depending on whether the liquid level sensor 5 detects the liquid level or not. Thus, it is so constituted that the liquid level sensor 5 may detect the liquid level to stop the operation of the bellows pump when 20 lit. of the waste liquor have been fed into the evaporation vessel, but it does not follow that the bellows pump is actuated according to a fall of the liquid level attended with the subsequent progress of the evaporation. The concentration-by-evaporation treatment apparatus outside this invention (Example 12) is equipped with a timer so that the concentration-by-evaporation treatment may be stopped when there elapsed the time which was previously measured as a time by which 20 lit. of the waste liquor are concentrated to 1.2 lit.

Observed was the smell generated from the concentration-by-evaporation treatment apparatus when the above two types of treatments were carried out, to obtain the results as shown in Table 2.

TABLE 2

| Test No. | Smell |
|---|---|
| 11 (This Invention) | A |
| 12 (Comparative Example) | D |

Symbols used in Table 2 to represent the evaluation on the ill smell means the following evaluation:
D: Seriously ill-smelling.
A: No ill-smelling at all.

As will be clear from Table 2, there is no smell in Test No. 11 in which the concentration-by-evaporation treatment apparatus of this invention is used, but there is serious smell (in particular, mercapto smell) in Test No. 12 in which the above comparative concentration-by-evaporation treatment apparatus is used.

Next, in the test apparatus of this invention, the liquid level sensor 5 was provided in the inside of the evaporation vessel. As a result, the liquid level showed slightly larger hunting (Test No. 3).

Subsequently, in the state that the liquid level sensor 5 was provided outside, a modification was made so that the bellows pump may be respectively switched off and on for its operation immediately depending on whether the liquid level was detected or not. As a result, there was shown substantially the same liquid level hunting (Test No. 14).

Further, in Test No. 14, the liquid level sensor 5 was provided in the inside of the evaporation vessel (Test No. 15). As a result, the liquid level hunting was more enlarged In the course of these Test No. 13 to No. 14, also observed was the smell generated from the concentration-by-evaporation treatment apparatus to obtain the results as shown in Table 3.

TABLE 3

| Test No. | Smell |
|---|---|
| 13 (This invention) | B |
| 14 (This invention) | B |
| 15 (This invention) | C |

Symbols used in Table 3 to represent the evaluation on the ill smell means the following evaluation:
C: Slightly ill-smelling.
B: Very slightly ill-smelling, but so slightly that no one becomes aware of the smell without careful smelling.

As will be clear from Table 3, results were inferior to Test No. 11 reported previously.

As described above, the invention of Example 2, which is provided with the means for continuously or intermittently feeding the waste liquor into the evaporation vessel according to a signal from the means for detecting the quantity of the waste liquor in the evaporation vessel, can surely feed the waste liquor to be treated, depending on the quantity of the waste liquor remaining in the evaporation vessel. Moreover, since the waste liquor to be treated can be treated by concentration-by-heating in a state that it is always kept in a prescribed quantity, the waste liquor can be treated by concentration-by-heating always in an optimum state, and there can be minimized the harmful or ill-smelling components generated from the photographic process waste liquor.

EXAMPLE 3

Example 1 was repeated except for the modification made as follows:

In the photographic process waste liquor 400 g of potassium carbonate were previously dissolved, and 500 g of sodium hydrogensulfate were projected into the stored liquid tank.

The heat density of the heating means was also controlled to about 4 kcal/cm$^2$, and an anti-foaming agent FS Antifoam 025 (trade name; available from Dow-Corning Corp.) in amount of 4 g was also previously added in the photographic process waste liquor.

Next, using the concentration-by-evaporation treatment apparatus having the cooling and condensing means but having no means for feeding water, another similar concentration-by-evaporation treatment was carried out.

In the above two tests, the quantity of the stored liquid in the stored liquid tank was measured at the time the tests were completed, and at the same time the smell generating from the concentration-by-evaporation treatment apparatus was observed in the course of the tests.

Results obtained are shown in Table 4.

TABLE 4

| Test No. | Stored water | Stored liquid quantity in stored liquid tank (lit.) | Smell |
| --- | --- | --- | --- |
| 16 (This invention | Present | 17 | A |
| 17 (Comparative Example) | None | 2 | D |

Symbols used in Table 4 to represent the evaluation on the ill smell means the following evaluation:
D: Seriously ill-smelling.
A: No ill-smelling at all.

As will be clear from Table 4, it is seen that the rate of condensation is high and no smell is generated in Test No. 16 employing the concentration-by-evaporation treatment apparatus of this invention, but the rate of condensation is low and seriously ill-smell is generated in Test No. 17 employing the comparative concentration-by-evaporation treatment apparatus.

We claim:

1. A method of treating photographic process waste liquor to concentrate the waste liquor in an evaporation vessel by evaporation, comprising the steps:
    (a) feeding the waste liquor into the evaporation vessel;
    (b) controlling the surface tension of the waste liquor to about 20 to 65 dyne/cm;
    (c) heating the liquor at a heat density of up to 17.2 kcals/cm$^2$ to evaporate the waste liquor;
    (d) detecting the quantity of waste liquor in the evaporation vessel and, stopping the feeding of the waste liquor when the liquor is at a predetermined level for a predetermined time; and starting the feeding of the waste liquor when the liquor is below a predetermined level for a predetermined time; and
    (e) feeding a gas into the waste liquor in the evaporation vessel;
whereby good thermal efficiency is promoted and the generation of noxious gases is restrained.

2. The method of claim 1 further comprising controlling the surface tension of the photographic process waste liquor in said evaporation vessel to about 20 to 60 dyne/cm.

3. The method of claim 2 wherein said surface tension of the photographic process waste liquor in said evaporation vessel is controlled to about 25 to 60 dyne/cm.

4. The method of claim 1 wherein the heat density is not less than 0.01 kcal/cm$^2$.

5. The method of claim 1, wherein the step of detecting the quantity of the waste liquor is by sensing the liquid level.

* * * * *

UNITED STATES PATENT AND TRADEMARK OFFICE
CERTIFICATE OF CORRECTION

PATENT NO. : 4,985,118
DATED : January 15, 1991
INVENTOR(S) : Kurematsu et al It is certified that error appears in the above-identified patent and that said Letters Patent is hereby corrected as shown below:

IN THE TITLE PAGE:

Item [75] Inventors, insert
  inventor --Nobutaka Goto--.

Item [56] References Cited, under "U.S. PATENT DOCUMENTS", insert the following:

3,915,712  10/1975  Herzhoff et al....159/13.2

Under "FOREIGN PATENT DOCUMENTS" insert the following:

51-12943   1976   Japan
51-89437   1974   Japan

Under "FOREIGN PATENT DOCUMENTS", Japanese patent "48-84462": Change the issue date from "1/1973" to --11/1973--.

Signed and Sealed this

Sixteenth Day of November, 1993

*Attest:*

BRUCE LEHMAN

*Attesting Officer*         *Commissioner of Patents and Trademarks*